United States Patent
Andreev et al.

(10) Patent No.: US 7,685,120 B2
(45) Date of Patent: Mar. 23, 2010

(54) METHOD FOR GENERATING AND PRIORITIZING MULTIPLE SEARCH RESULTS

(75) Inventors: Dmitry Andreev, Syracuse, NY (US); Franklin Charles Breslau, Teaneck, NJ (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/776,593

(22) Filed: Jul. 12, 2007

(65) Prior Publication Data
US 2009/0019363 A1    Jan. 15, 2009

(51) Int. Cl.
*G06F 7/00*    (2006.01)
(52) U.S. Cl. .................. 707/5; 707/3; 707/102
(58) Field of Classification Search ............ 707/3, 707/5, 102
See application file for complete search history.

(56) References Cited

U.S. PATENT DOCUMENTS

| | | | |
|---|---|---|---|
| 5,490,061 A * | 2/1996 | Tolin et al. ............... 704/2 |
| 6,065,003 A * | 5/2000 | Sedluk ........................ 707/6 |
| 2002/0042784 A1 | 4/2002 | Kerven et al. |
| 2003/0097357 A1* | 5/2003 | Ferrari et al. ............. 707/3 |
| 2005/0060290 A1 | 3/2005 | Herscovici et al. |
| 2006/0101017 A1 | 5/2006 | Eder |
| 2007/0079239 A1* | 4/2007 | Ghassabian ............ 715/707 |
| 2007/0112554 A1* | 5/2007 | Goradia ..................... 704/4 |

* cited by examiner

*Primary Examiner*—James Trujillo
*Assistant Examiner*—Linh Black
(74) *Attorney, Agent, or Firm*—Schmeiser, Olsen & Watts; Anna Linne

(57) ABSTRACT

A method for generating and prioritizing multiple search results is disclosed. A database stores search results in an information storage and retrieval system. A search program executes on a computer system coupled to the database. The search program receives a search request from a user input. The search program parses the search request into at least one search term. The search program performs a loop comprising steps associating a priority adjustment value with each search term, generating a search result, calculating a priority adjustment sum of the generated search result, inserting the at least one search term, the generated search result, and the calculated priority adjustment sum in the search result list, and modifying the at least one search term and the priority adjustment value associated with each search term to perform a next iteration of the loop.

20 Claims, 4 Drawing Sheets

METHOD FOR GENERATING AND PRIORITIZING MULTIPLE SEARCH RESULTS

FIELD OF THE INVENTION

The present invention discloses a method for generating and prioritizing multiple search results.

BACKGROUND OF THE INVENTION

Conventional information storage and retrieval systems may comprise several databases. A typical search request to a conventional information system is determining whether an entry having a certain property described in the search request exists within the system. In representing a real object as an entry in a database, a property of the entry is often represented in an approximated value. Approximate values for different entries may differ from each other even for an identical property of real objects represented by entries. Consequently a search request cannot find a match among entries with different approximate values, even when the properties of real objects are same as the search request. Thus, conventional information storage and retrieval systems may not provide a result intended by a search request to find a match for an object with various properties represented as approximate values.

Thus, there is a need for a method and system that overcomes at least one of the preceding disadvantages of current information storage and retrieval methods and systems.

SUMMARY OF THE INVENTION

The present invention provides a method for generating and prioritizing search results in an information storage and retrieval system comprising a search program and a database, the search program being executed on a computer system, the database being coupled to the computer system, the method comprising:
  receiving a search request from an input by a user;
  parsing the search request into at least one search term;
  iterating a loop for MAX iterations, wherein MAX is an integer of at least one; and
  displaying a search result list to the user, the search result list being stored in a memory device coupled to the computer system,
    wherein each iteration of said iterating comprises:
    associating a priority adjustment value with each search term, each search term and its associated priority adjustment value being stored within a data structure;
    generating a search result for the received search request by performing a search using the at least one search term;
    calculating a priority adjustment sum of the generated search result by summing the priority adjustment values associated with each search term;
    inserting the at least one search term, the generated search result, and the calculated priority adjustment sum in the search result list; and
    modifying the at least one search term and the priority adjustment value associated with each search term to perform a next iteration of the loop.

The present invention provides a computer program product, comprising a computer usable medium having a computer readable program code embodied therein, said computer readable program code containing instructions that when executed by a processor of a computer system implement a method for generating and prioritizing search results in an information storage and retrieval system comprising a search program and a database, the search program being executed on a computer system, the database being coupled to the computer system, the method comprising:
  receiving a search request from an input by a user;
  parsing the search request into at least one search term;
  iterating a loop for MAX iterations, wherein MAX is an integer of at least one; and
  displaying a search result list to the user, the search result list being stored in a memory device coupled to the computer system,
    wherein each iteration of said iterating comprises:
    associating a priority adjustment value with each search term, each search term and its associated priority adjustment value being stored within a data structure;
    generating a search result for the received search request by performing a search using the at least one search term;
    calculating a priority adjustment sum of the generated search result by summing the priority adjustment values associated with each search term;
    inserting the at least one search term, the generated search result, and the calculated priority adjustment sum in the search result list; and
    modifying the at least one search term and the priority adjustment value associated with each search term to perform a next iteration of the loop.

The present invention provides a computer system comprising a processor and a computer readable memory unit coupled to the processor, said memory unit containing instructions that when executed by the processor implement a method for generating and prioritizing search results in an information storage and retrieval system comprising a search program and a database, the search program being executed on a computer system, the database being coupled to the computer system, the method comprising:
  receiving a search request from an input by a user;
  parsing the search request into at least one search term;
  iterating a loop for MAX iterations, wherein MAX is an integer of at least one; and
  displaying a search result list to the user, the search result list being stored in a memory device coupled to the computer system,
    wherein each iteration of said iterating comprises:
    associating a priority adjustment value with each search term, each search term and its associated priority adjustment value being stored within a data structure;
    generating a search result for the received search request by performing a search using the at least one search term;
    calculating a priority adjustment sum of the generated search result by summing the priority adjustment values associated with each search term;
    inserting the at least one search term, the generated search result, and the calculated priority adjustment sum in the search result list; and
    modifying the at least one search term and the priority adjustment value associated with each search term to perform a next iteration of the loop.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for generating and prioritizing search results in an information storage and retrieval system comprising a search program and a database, the search program being executed on a computer system, the database being coupled to the computer system, the method comprising:

receiving a search request from an input by a user;

parsing the search request into at least one search term;

iterating a loop for MAX iterations, wherein MAX is an integer of at least one; and displaying a search result list to the user, the search result list being stored in a memory device coupled to the computer system, wherein each iteration of said iterating comprises:

associating a priority adjustment value with each search term, each search term and its associated priority adjustment value being stored within a data structure;

generating a search result for the received search request by performing a search using the at least one search term;

calculating a priority adjustment sum of the generated search result by summing the priority adjustment values associated with each search term;

inserting the at least one search term, the generated search result, and the calculated priority adjustment sum in the search result list; and modifying the at least one search term and the priority adjustment value associated with each search term to perform a next iteration of the loop.

The present invention provides a method and system that overcomes at least one of the current disadvantages of conventional method and system for generating and prioritizing multiple search results.

DETAILED DESCRIPTION OF THE INVENTION

Figure 1:
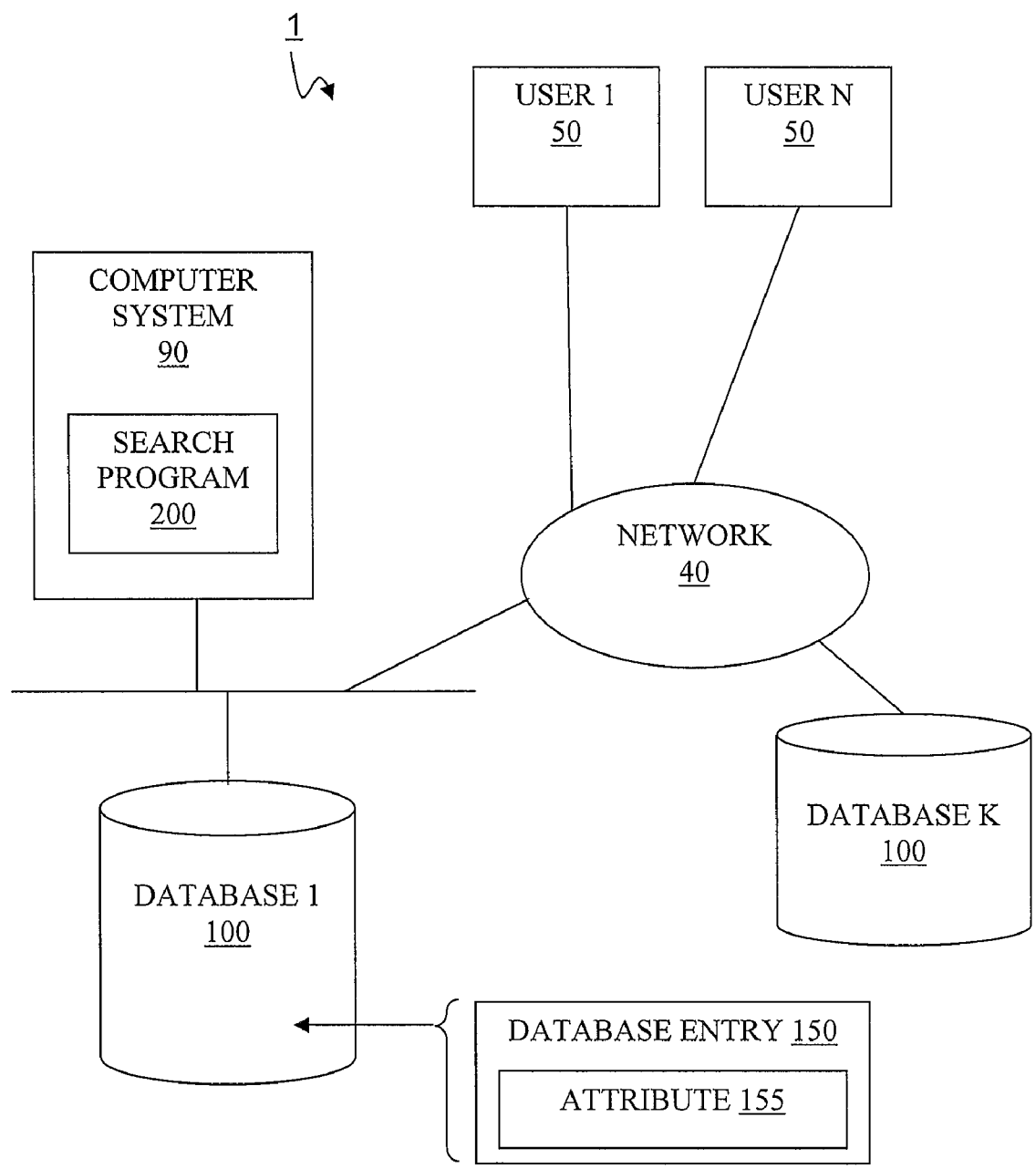
FIG. 1 illustrates a system for information storage and retrieval used for generating and prioritizing multiple search results, in accordance with embodiments of the present invention.

FIG. 1 illustrates a system for information storage and retrieval used for generating and prioritizing multiple search results, in accordance with embodiments of the present invention.

The information storage and retrieval system 1 (hereinafter information system) may have multiple databases 100 coupled to a network 40 and multiple user computers 50. A search program 200 is executed on a computer system 90. The search program may receive a search request either from a user computer 50 coupled to the network 40 or directly from the computer system 90. The search program performs a search directed in the search request upon all databases within the information system.

In a database 100, an object is recorded as a database entry 150. Each database entry has multiple attributes 155 to describe properties of the object. Each attribute is instantiated with a value within a range reasonable for the attribute and a proper unit of measurement. For example, if a database entry describes an individual person and if a height attribute of the database entry describes the height of the individual in inches, then a value for the height attribute may be 72, but not 6, as the height attribute might be mistakenly represented in feet. In instantiating certain attributes, approximate values are often used. In the previous example, the height attribute may be approximated as 71, 72, or 73 depending on a tool used in the measurement, a posture of the individual at the time of the measurement, etc. Moreover, there is always a possibility of human error and/or misrepresentation while typing in or selecting a value for an attribute. In the previous example, the value of the height attribute may be stored as 62 instead of 72, as a result of a typographical error during an input of the value. If a search request is received to look up a match of a database entry for an individual with 72 inches of height, a database entry having the value of the height attribute value as 62 cannot be found as a match for the search request, because the height attribute of the database entry has a misrepresented value. Also, if a same object is stored as more than one database entries throughout multiple databases within an information system, a search request may not find all database entries but find some of the database entries.

An object in the real world has multiple properties of different characteristics. Consequently, a database entry representing an object reflects such multiple properties of different characteristics in attributes of the database entry. Some attributes describe intrinsically immutable properties of an object stored as a database entry. Such properties are easily recognizable traits of an object which are difficult to misrepresent against the object. Examples of intrinsically immutable properties of an individual may be, inter alia, gender, height, etc. On the other hand, some properties are more susceptible to manipulation without being noticed of such misrepresentation. Examples of easily mutable properties of an individual may be, inter alia, a residential address, a date of birth, a social security number, etc.

The method of present invention provides more extensive and improved search results for a search request than a conventional information system, when a database entry describes an object with multiple properties of different characteristics. Examples of conventional information systems may be, inter alia, a database system for governmental organizations of law enforcement purposes, etc.

Figure 2:
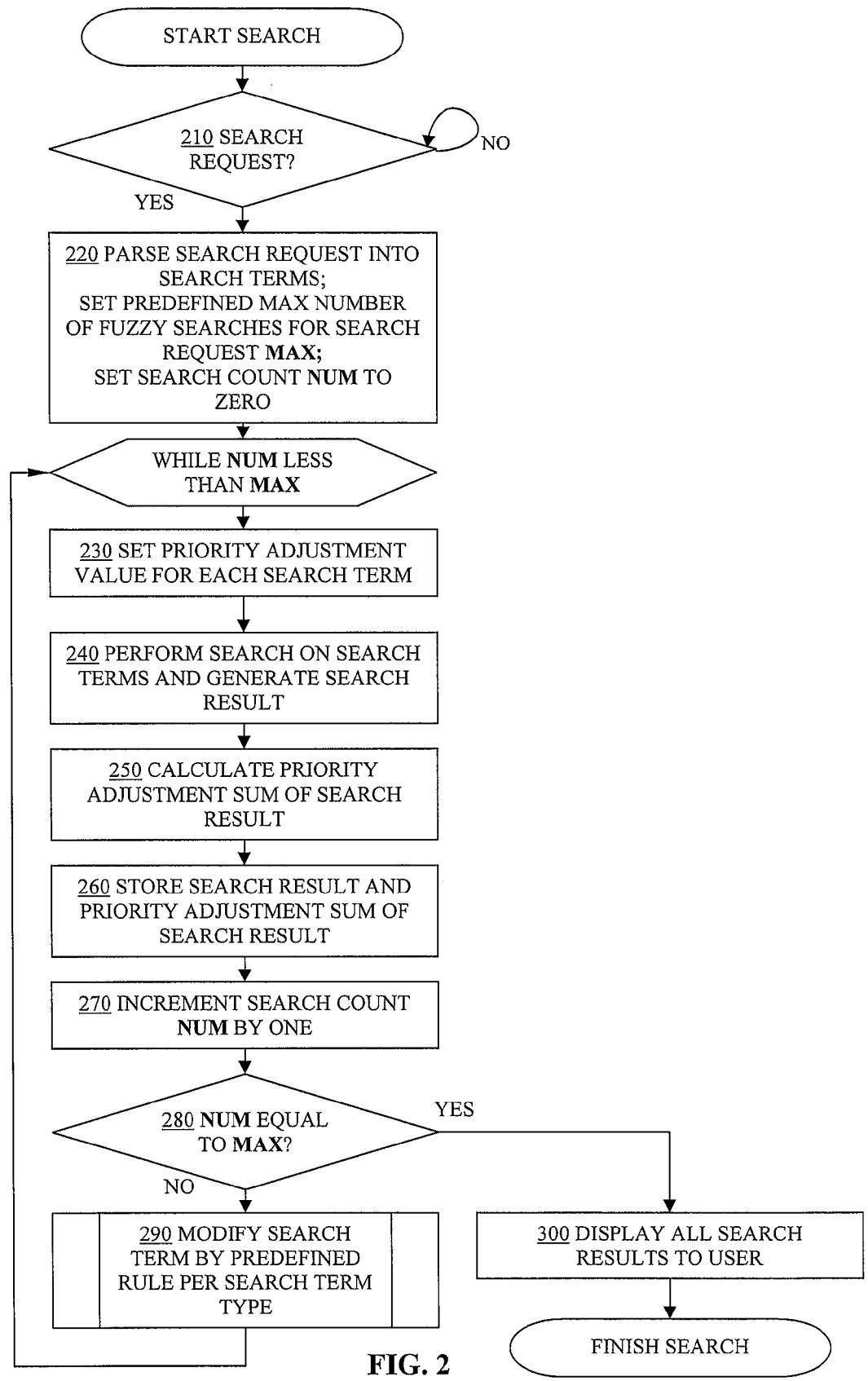
FIG. 2 is a flowchart depicting a method for generating and prioritizing multiple search results, in accordance with the embodiments of the present invention.

FIG. 2 is a flowchart depicting a method for generating and prioritizing multiple search results, in accordance with embodiments of the present invention.

The search program of the present invention performs a fuzzy search upon receiving a search request. The fuzzy search means a series of searches for a single search request, wherein each search is performed on modified search terms derived from original search terms, according to the method of the present invention. For details on search term modification, see description of step 290, infra.

The present invention prioritizes search results generated with the fuzzy search by assigning different priority adjustment values depending on the quality of a matching result. A priority adjustment value is an integer in a range from 0 to 100 which represents the degree of departure of each search term from an original search term. Thus, a magnitude of priority adjustment value of a search term is reversely related to a priority of the search term. A search term with a priority adjustment value 0 means that the search term is an original search term, and the search term has the highest priority. A search term with a priority adjustment value larger than 0 means that the search term has been modified, and the search term has lower priority than an original search term.

A priority adjustment value of a search term may also denote a property represented by the search term. A search term representing any intrinsically immutable properties has a lower priority, and a search term representing mutable properties has a higher priority. Consequently, a strict matching result with original search terms is calculated in the highest priority, a matching result with modified search terms for mutable properties is calculated in a lower priority than the strict matching result, and a matching result with modified search terms for intrinsically immutable properties is calculated in the lowest priority among the abovementioned matching results. For details on adjusting priority for a search term, see descriptions of steps 230 and 290, infra.

In step 210, the search program waits for a search request input by a user. Upon receiving the search request, the search program proceeds to step 220.

In step 220, the search program parses the search request into search terms $T_1$ to $T_n$, wherein n is a number of search terms in the search request. The search program also sets a predefined maximum number of fuzzy searches (MAX) that could be performed upon the search request with a natural number. The search program initializes a search count (NUM) to zero, wherein NUM represents a number of searches performed.

The search program in step 230 associates a priority adjustment value for each search term $T_1$ to $T_n$ as $P_1$ to $P_n$, respectively. A priority adjustment value for each search term represents how remote a search term is from an original search term. Thus, in a first iteration of the method, because search terms $T_1$ to $T_n$ are original as in the search request, priority adjustment values for each search term $P_1$ to $P_n$ are zero, denoting that a search result would be a strict matching result with the highest priority. In later iterations of the method after modifying search terms in step 290, because search terms $T_1$ to $T_n$ are modified, respective priority adjustment value $P_1$ to $P_n$ are greater than zero to indicate that the search term is modified. As to a magnitude of a priority adjustment value, see description of step 290, infra.

In step 240, the search program performs a search on search terms $T_1$ to $T_n$ and generates a search result.

In step 250, the search program calculates a priority adjustment sum (P) for the search result of step 240 by summing priority adjustment values for search terms $T_1$ to $T_n$ in the search request as:

$$P = \sum_{i=1}^{n} P_i$$

The priority adjustment sum (P) value indicates an extent to which original search terms were modified to generate the search result in step 240. Consequently, a search result with a smaller priority adjustment sum (P) value represents a search result with higher priority because the search result is closer to a strictly matching search result with original search terms of the search request.

In one embodiment, the search results list may be sorted in an order of the priority adjustment sum (P) value of a search result, to put high priority search results on top of the search results list. In this embodiment, the priority adjustment sum (P) value works as a rank of a search result within the search result list. The priority adjustment sum (P) value of a search result collectively indicates how reliable the search result is based on original search terms of the search request. The priority adjustment sum (P) value of a search result also quantifies a degree of departure of modified search terms from original search terms.

In step 260, the search program stores the search result of step 240 and the priority adjustment sum (P) of step 250 corresponding to the search result in the search results list into a memory device, including but not limited to the database. In storing the search result into the search result list, the search program may elect a location for the search result to keep the status of the search result list organized in an order of priority adjustment sum (P) value.

In step 270, the search program increments the search count (NUM) by one to indicate one instance out of the maximum number of fuzzy searches (MAX) is completed.

The search program in step 280 examines whether the search count (NUM) becomes equal to the maximum number of fuzzy searches (MAX). If the search program determines that the search count (NUM) is less than the maximum number of fuzzy searches (MAX), the search program proceeds to step 290. If the search program determines that the search count (NUM) becomes equal to the maximum number of fuzzy searches (MAX), then the search program proceeds to step 300.

In step 290, the search program modifies search terms for a next fuzzy search. In modifying search terms, the search program employs a predefined rule per a type of each search term. Examples of types available for a search term type may be, inter alia, plain text, number, special types, alpha-numeric words, etc. See description in FIG. 3, infra, for details on modifying search terms.

After modifying search terms for the next fuzzy search in step 290 in pursuant to foregoing rules, the search program loops back to step 230.

In step 300, the search program reports to the user the search results list comprising all search result and the priority adjustment sum (P) of each search result. As described in steps 250 and 260, the search results list is organized in an order of the priority adjustment sum (P) of the search results, thus enabling users to efficiently locate and retrieve search results with higher priorities.

Figure 3:
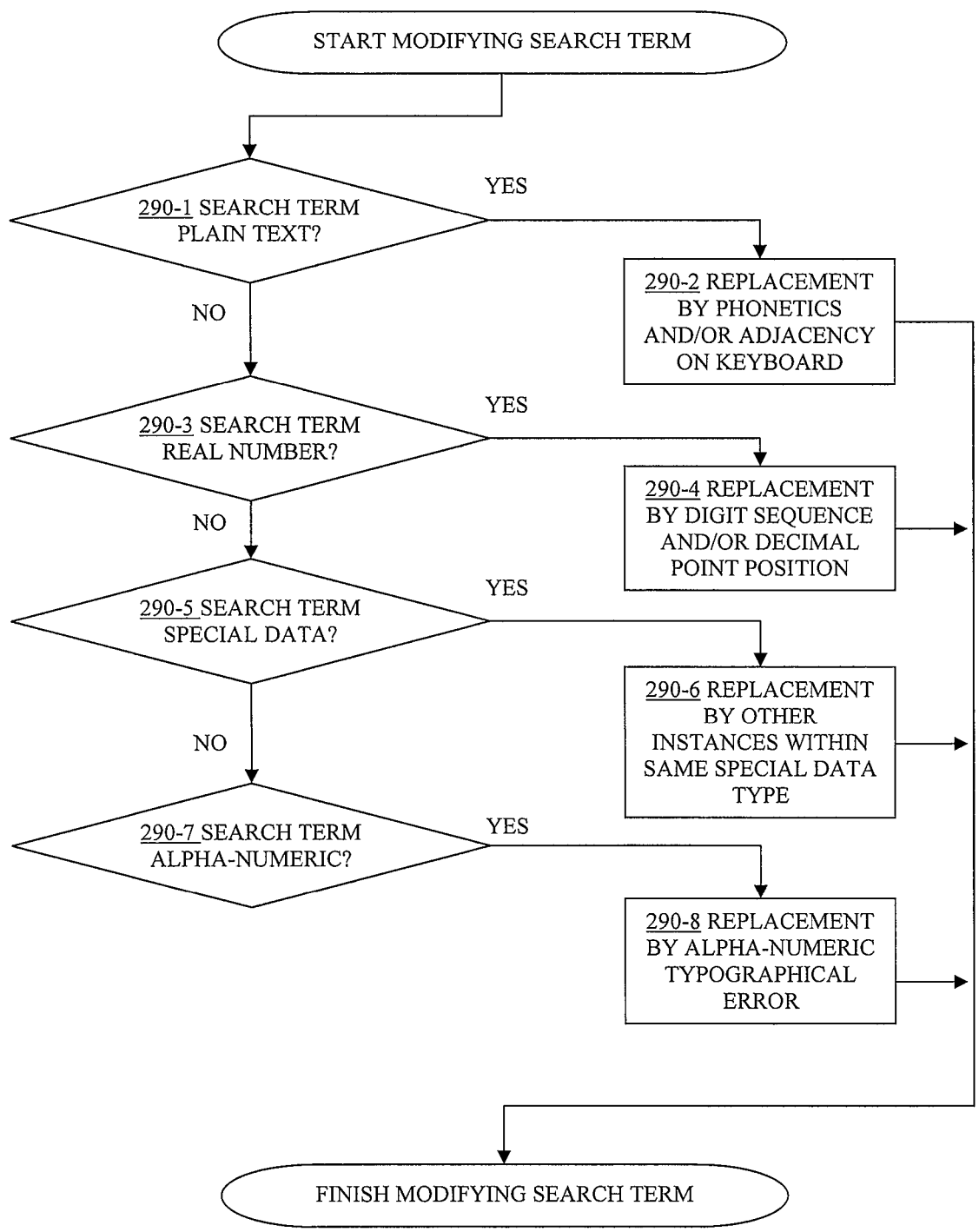
FIG. 3 is a flowchart depicting a method for modifying search terms in step 290 of the method illustrated in FIG. 2, supra, in accordance with embodiments of the present invention.

FIG. 3 is a flowchart depicting a method for modifying search terms in step 290 of the method illustrated in FIG. 2, supra, in accordance with embodiments of the present invention.

Search terms comprising the next search are derived from previous search terms. The search program generates a new search term by applying a rule according to a type of a previous search term. Each new search term is assigned to a predefined priority adjustment value.

In step 290-1, the search program determines whether a previous search term is plain text. If the search program determines that the previous search term is plain text, the search program in step 290-2 replaces an individual character or a group of characters in the previous search term by phonetics and/or by adjacency of characters on a keyboard. If the search program determines that the previous search term is not plain text, the search program proceeds to step 290-3.

In replacement by phonetics, the search program in step 290-2 replaces a certain character in the previous search term with a phonetic equivalent of the character by looking up a phonetic equivalents dictionary. A phonetic equivalent depends upon a language employed for the search. The new search term generated by phonetic replacement is an identically or similarly pronounced term with the previous search term. For example, in English, /ph/ and /f/ sounds are interchangeable, /ea/ and /ee/ sounds are interchangeable, /ou/ and /o/ are interchangeable, etc. A priority adjustment value of a new search term generated by phonetic replacement may be, inter alia, 10 from a range of 0 to 100, according to how one pronunciation is commonly mistaken and/or misspelled as the other pronunciation, etc. The method of present invention may associate a priority adjustment value to each replacement, which indicates how probable such replacement is. Such association may also be stored in the phonetic equivalents dictionary.

In a replacement by adjacency on a keyboard, the search program in step 290-2 replaces a certain character in the previous search term with a character typed by neighboring keys on the keyboard. Probable candidates for the replacement by adjacency on a keyboard are stored in a typographical error dictionary. A priority adjustment value of a new search term generated by the replacement by adjacency of the new search term relative to the previous search term on a keyboard may be, inter alia, 10 from a range of 0 to 100, according to a probability of typographical error while typing in a word, etc. The method of present invention may associate a priority adjustment value to each replacement, which indicates how probable such replacement is. Such association may also be stored in the typographical errors dictionary.

In step 290-3, the search program determines whether a previous search term is a number. If the search program determines that the previous search term is a number, the search program in step 290-4 generates a new search term by replacing an individual digit in the previous search term with an immediately preceding or succeeding digit or by shifting a decimal point in a forward or reverse direction through a digit sequence as the previous search term. A priority adjustment value of the new search term may be, inter alia, 10 from a range 0 to 100, according to a probability of typographical error while typing in a number, etc. The method of present invention may associate a priority adjustment value with each replacement, which indicates how probable each replacement is. Such association may also be stored in the typographical errors dictionary. If the search program determines that the previous search term is not a number, the search program proceeds to step 290-5.

In step 290-5, the search program determines whether a previous search term is a special data. If the search program determines that the previous search term is a special data, the search program in step 290-6 replaces the previous search term with an interchangeable special data term. A special data dictionary comprising a special data, an interchangeable special data term, and an association between the special data and the interchangeable special data term is stored in a special data dictionary. A special data is interchangeable with other special data if both special data describes similar attribute of a database entry. Examples of special data type may be, inter alia, a color table, geographic names, gender, etc. An eye color of brown may be interchangeable with, inter alia, hazel. The method of the present invention may have multiple sets of priority adjustment value data for each special data type. A priority adjustment value of a new search term generated from an eye color may be, inter alia, 20 from a range of 0 to 100, according to similarity of two eye colors, etc. A priority adjustment value of a new search term generated from a gender may be, inter alia, 100 from a range of 0 to 100, because gender data is intrinsically immutable.

The method of the present invention may associate a priority adjustment value with each replacement, which indicates how probable each replacement is. Such association may also be stored in the special data dictionary. If the search program determines that the previous search term is not a special data, the search program proceeds to step 290-7.

In step 290-7, the search program determines whether a previous search term is alpha-numeric data. Any previous search term that has not been determined as one of plain text, a number, or a special data is determined as an alpha-numeric data. In step 290-8, the search program replaces an individual character in the previous search term with a character on a key adjacent to the character on a keyboard. A priority adjustment value of a new search term may be, inter alia, 10 from a range 0 to 100, according to a probability of a typographical error while typing in an alpha-numeric text, etc. The method of the present invention may associate a priority adjustment value with each replacement, which indicates how probable each replacement is. Such association may also be stored in the typographical errors dictionary.

For example, an information system may be used by a State Department of Motor Vehicles (DMV) to ascertain whether or not an applicant for a driver's license in one state has been already licensed in any state in the United States. The present invention may search a DMV database with all reasonable variants of data presented in a license application of the applicant, including but not limited to, name, date of birth, social security number, residential address, gender, height, eye color, etc. Each data entry stored in the DMV database has same types of data presented in the license application. Per data type, a search term is modified pursuant to the rules described in step 290 of FIG. 2, supra, and the search program generates at least one new search term. Depending on immutability of a property represented by each data, a priority adjustment value may vary. If a datum represents an intrinsically immutable property such as gender or height, a priority adjustment value for the datum would be set to a highest value on a range of 0 to 100, because the datum would be easily recognized if the datum has been mutated and/or misrepresents the applicant. On the other hand, if a datum represents a mutable property such as residential address, a priority adjustment value for the data would be set to a lowest value on a range of 0 to 100, because the datum might have been mutated and incorrectly represent the applicant without being noticed by visual inspection of the applicant.

By generating multiple search results from a single search request, the search program can find a matching entry for a search request even if a data value in the matching entry is not identical to a data value in the search request. Also, by prioritizing generated search results according to mutability of data, the method of the present invention can efficiently find a closer match among all generated search results.

Figure 4:
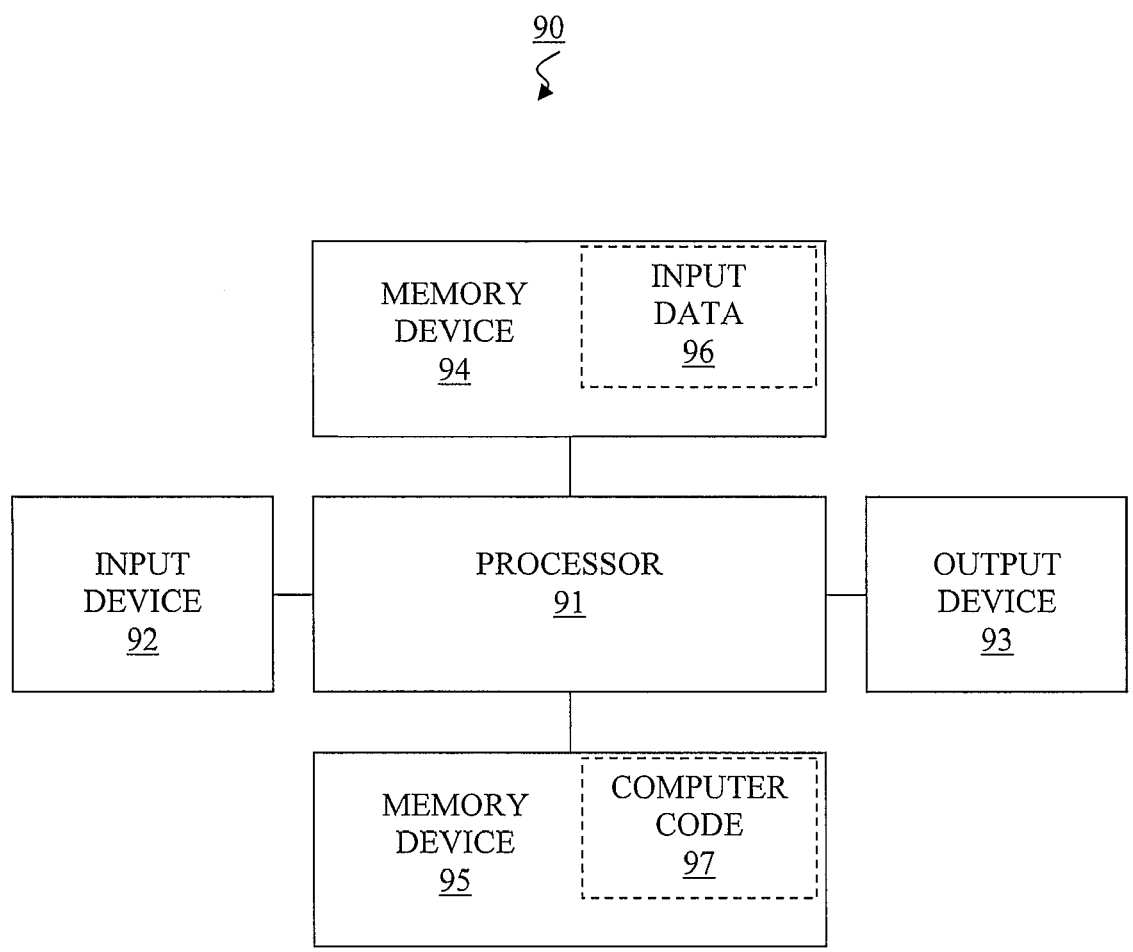
FIG. 4 illustrates a computer system used for generating and prioritizing multiple search results, in accordance with embodiments of the present invention.

FIG. 4 illustrates a computer system 90 used for generating and prioritizing multiple search results, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for generating and prioritizing multiple search results according to the present invention. The processor 91 executes the computer code 97.

The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for generating and prioritizing multiple search results of the present invention. Thus, the present invention discloses a process for supporting computer infrastructure, comprising creating, integrating, hosting, maintaining and deploying computer-readable code into a computing system (e.g., computing system 90), wherein the code in combination with the computing system is capable of performing a method for generating and prioritizing multiple search results.

In another embodiment, the invention provides a business method that performs the process steps of the invention on a subscription, advertising and/or fee basis. That is, a service provider, such as a Solution Integrator, can offer to create, maintain, support, etc. a process for generating and prioritizing multiple search results of the present invention. In this case, the service provider can create, maintain, and support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for generating and prioritizing search results in an information storage and retrieval system comprising a search program and a database, the search program being executed on a computer system, the database being coupled to the computer system, the method comprising:
   receiving a search request from an input by a user;
   parsing the search request into at least one search term;
   iterating a loop for MAX iterations, wherein MAX is an integer of at least two, wherein MAX represents a maximum number of searches to be performed upon the search request such that the search request generates a search result that comprises a respective set of search terms and a respective set of search results associated with the respective set of search terms from each iteration of said MAX iterations, and wherein said search terms in the respective set of search terms in said each iteration are modified to render the search result more comprehensive in said each iteration; and
   displaying a search result list to the user, the search result list being stored in a memory device coupled to the computer system,
   wherein each iteration of said iterating comprises:
      associating a respective priority adjustment value with each search term of said at least one search term for a current iteration, said each search term and its associated respective priority adjustment value being stored within a data structure, wherein said respective priority adjustment value quantifies a respective level of modification between said each search term in the search request and said each term in the current iteration, and wherein said respective priority adjustment value associated with said each term increases according to a number of iterations performed;
      generating a search result of the current iteration for the received search request by performing a search using the at least one search term for the current iteration;
      calculating a priority adjustment sum of the generated search result for the current iteration by summing the respective priority adjustment value associated with said each search term;
      inserting the at least one search term for the current iteration, the generated search result for the current iteration, and the calculated priority adjustment sum for the current iteration in the search result list; and
      modifying the at least one search term for the current iteration into another set of at least one search term for a next iteration of the loop, wherein said modifying utilizes a predefined rules for modification respective to a type of said each search term, wherein the type is selected from the group consisting of plain text, number, special type, and alpha-numeric word.

2. The method of claim 1, said modifying comprising:
   determining that a first search term of the at least one search term comprises a typographical error; and
   replacing the first search term with a replacement term of the first search term,
   wherein a typographical errors dictionary comprises the first search term, the replacement term, and an association between the first search term and the replacement term, and wherein the typographical errors dictionary is stored in the memory device.

3. The method of claim 1, said modifying comprising:
   determining a data type of a search term of the at least one search term as plain text; and
   replacing a pronunciation unit comprising at least one letter in the search term with a phonetic equivalent of the pronunciation unit,
   wherein a phonetic equivalents dictionary comprises the pronunciation unit, the phonetic equivalent, and an association between the pronunciation unit and the phonetic equivalent, and wherein the phonetic equivalents dictionary is stored in the memory device.

4. The method of claim 1, said modifying comprising:
   determining a data type of a search term of the at least one search term as a real number; and
   replacing the search term with a replacement number,
   wherein a digit sequence of the replacement number is identical to a digit sequence of the search term, and wherein a decimal point position of the replacement number is different from a decimal point position of the search term.

5. The method of claim 1, said modifying comprising:
   determining a data type of a search term of said at least one search term as a special data; and
   replacing the search term with an interchangeable special data term,
   wherein a special data dictionary comprises the search term, the interchangeable special data term, and an association between the search term and the interchangeable special data term, and wherein the special data dictionary is stored in the memory device.

6. A computer program product, comprising a computer usable medium having a computer readable program code embodied therein, said computer readable program code containing instructions that when executed by a processor of a computer system implement a method for generating and prioritizing search results in an information storage and retrieval system comprising a search program and a database, the search program being executed on a computer system, the database being coupled to the computer system, the method comprising:
   receiving a search request from an input by a user;
   parsing the search request into at least one search term;
   iterating a loop for MAX iterations, wherein MAX is an integer of at least two, wherein MAX represents a maximum number of searches to be performed upon the search request such that the search request generates a search result that comprises a respective set of search terms and a respective set of search results associated with the respective set of search terms from each iteration of said MAX iterations, and wherein said search terms in the respective set of search terms in said each iteration are modified to render the search result more comprehensive in said each iteration; and
   displaying a search result list to the user, the search result list being stored in a memory device coupled to the computer system,
   wherein each iteration of said iterating comprises:
      associating a respective priority adjustment value with each search term of said at least one search term for a current iteration, said each search term and its associated respective priority adjustment value being stored within a data structure, wherein said respective priority adjustment value quantifies a respective level of modification between said each search term in the search request and said each term in the current iteration, and wherein said respective priority adjustment value associated with said each term increases according to a number of iterations performed;
      generating a search result of the current iteration for the received search request by performing a search using the at least one search term for the current iteration;
      calculating a priority adjustment sum of the generated search result for the current iteration by summing the respective priority adjustment value associated with said each search term;
      inserting the at least one search term for the current iteration, the generated search result for the current iteration, and the calculated priority adjustment sum for the current iteration in the search result list; and
      modifying the at least one search term for the current iteration into another set of at least one search term for a next iteration of the loop, wherein said modifying utilizes a predefined rules for modification respective to a type of said each search term, wherein the type is selected from the group consisting of plain text, number, special type, and alpha-numeric word.

7. The computer program product of claim 6, said modifying comprising:
   determining that a first search term of the at least one search term comprises a typographical error; and
   replacing the first search term with a replacement term of the first search term,
   wherein a typographical errors dictionary comprises the first search term, the replacement term, and an association between the first search term and the replacement term, and wherein the typographical errors dictionary is stored in the memory device.

8. The computer program product of claim 6, said modifying comprising:
   determining a data type of a search term of the at least one search term as plain text; and
   replacing a pronunciation unit comprising at least one letter in the search term with a phonetic equivalent of the pronunciation unit,
   wherein a phonetic equivalents dictionary comprises the pronunciation unit, the phonetic equivalent, and an association between the pronunciation unit and the phonetic equivalent, and wherein the phonetic equivalents dictionary is stored in the memory device.

9. The computer program product of claim 6, said modifying comprising:
   determining a data type of a search term of the at least one search term as a real number; and
   replacing the search term with a replacement number,
   wherein a digit sequence of the replacement number is identical to a digit sequence of the search term, and wherein a decimal point position of the replacement number is different from a decimal point position of the search term.

10. The computer program product of claim 6, said modifying comprising:
    determining a data type of a search term of said at least one search term as a special data; and
    replacing the search term with an interchangeable special data term,
    wherein a special data dictionary comprises the search term, the interchangeable special data term, and an association between the search term and the interchangeable special data term, and wherein the special data dictionary is stored in the memory device.

11. A computer system comprising a processor and a computer readable memory unit coupled to the processor, said memory unit containing instructions that when executed by the processor implement a method for generating and prioritizing search results in an information storage and retrieval system comprising a search program and a database, the search program being executed on a computer system, the database being coupled to the computer system, the method comprising:
    receiving a search request from an input by a user;
    parsing the search request into at least one search term;
    iterating a loop for MAX iterations, wherein MAX is an integer of at least two, wherein MAX represents a maximum number of searches to be performed upon the search request such that the search request generates a search result that comprises a respective set of search terms and a respective set of search results associated with the respective set of search terms from each iteration of said MAX iterations, and wherein said search terms in the respective set of search terms in said each iteration are modified to render the search result more comprehensive in said each iteration; and displaying a search result list to the user, the search result list being stored in a memory device coupled to the computer system, wherein each iteration of said iterating comprises:

associating a respective priority adjustment value with each search term of said at least one search term for a current iteration, said each search term and its associated respective priority adjustment value being stored within a data structure, wherein said respective priority adjustment value quantifies a respective level of modification between said each search term in the search request and said each term in the current iteration, and wherein said respective priority adjustment value associated with said each term increases according to a number of iterations performed;

generating a search result of the current iteration for the received search request by performing a search using the at least one search term for the current iteration;

calculating a priority adjustment sum of the generated search result for the current iteration by summing the respective priority adjustment value associated with said each search term;

inserting the at least one search term for the current iteration, the generated search result for the current iteration, and the calculated priority adjustment sum for the current iteration in the search result list; and modifying the at least one search term for the current iteration into another set of at least one search term for a next iteration of the loop, wherein said modifying utilizes a predefined rules for modification respective to a type of said each search term, wherein the type is selected from the group consisting of plain text, number, special type, and alpha-numeric word.

12. The computer system of claim 11, said modifying comprising:

determining that a first search term of the at least one search term comprises a typographical error; and replacing the first search term with a replacement term of the first search term, wherein a typographical errors dictionary comprises the first search term, the replacement term, and an association between the first search term and the replacement term, and wherein the typographical errors dictionary is stored in the memory device.

13. The computer system of claim 11, said modifying comprising:

determining a data type of a search term of the at least one search term as plain text; and replacing a pronunciation unit comprising at least one letter in the search term with a phonetic equivalent of the pronunciation unit, wherein a phonetic equivalents dictionary comprises the pronunciation unit, the phonetic equivalent, and an association between the pronunciation unit and the phonetic equivalent, and wherein the phonetic equivalents dictionary is stored in the memory device.

14. The computer system of claim 11, said modifying comprising:

determining a data type of a search term of the at least one search term as a real number; and replacing the search term with a replacement number, wherein a digit sequence of the replacement number is identical to a digit sequence of the search term, and wherein a decimal point position of the replacement number is different from a decimal point position of the search term.

15. The computer system of claim 11, said modifying comprising:

determining a data type of a search term of said at least one search term as a special data; and replacing the search term with an interchangeable special data term, wherein a special data dictionary comprises the search term, the interchangeable special data term, and an association between the search term and the interchangeable special data term, and wherein the special data dictionary is stored in the memory device.

16. A process for supporting computer infrastructure, said process comprising providing at least one support service for at least one of creating, integrating, hosting, maintaining, and deploying computer-readable code in a computing system, wherein the code in combination with the computing system is capable of performing a method for generating and prioritizing search results in an information storage and retrieval system comprising a search program and a database, the search program being executed on a computer system, the database being coupled to the computer system, the method comprising:

receiving a search request from an input by a user;

parsing the search request into at least one search term;

iterating a loop for MAX iterations, wherein MAX is an integer of at least two, wherein MAX represents a maximum number of searches to be performed upon the search request such that the search request generates a search result that comprises a respective set of search terms and a respective set of search results associated with the respective set of search terms from each iteration of said MAX iterations, and wherein said search terms in the respective set of search terms in said each iteration are modified to render the search result more comprehensive in said each iteration; and displaying a search result list to the user, the search result list being stored in a memory device coupled to the computer system, wherein each iteration of said iterating comprises:

associating a respective priority adjustment value with each search term of said at least one search term for a current iteration, said each search term and its associated respective priority adjustment value being stored within a data structure, wherein said respective priority adjustment value quantifies a respective level of modification between said each search term in the search request and said each term in the current iteration, and wherein said respective priority adjustment value associated with said each term increases according to a number of iterations performed;

generating a search result of the current iteration for the received search request by performing a search using the at least one search term for the current iteration;

calculating a priority adjustment sum of the generated search result for the current iteration by summing the respective priority adjustment value associated with said each search term;

inserting the at least one search term for the current iteration, the generated search result for the current iteration, and the calculated priority adjustment sum for the current iteration in the search result list; and modifying the at least one search term for the current iteration into another set of at least one search term for a next iteration of the loop, wherein said modifying utilizes a predefined rules for modification respective to a type of said each search term, wherein the type is selected from the group consisting of plain text, number, special type, and alpha-numeric word.

17. The process of claim 16, said modifying comprising:

determining that a first search term of the at least one search term comprises a typographical error; and replacing the first search term with a replacement term of the first search term, wherein a typographical errors dictionary comprises the first search term, the replacement term, and an association between the first search term and the replacement term, and wherein the typographical errors dictionary is stored in the memory device.

18. The process of claim 16, said modifying comprising:

determining a data type of a search term of the at least one search term as plain text; and replacing a pronunciation unit comprising at least one letter in the search term with a phonetic equivalent of the pronunciation unit, wherein a phonetic equivalents dictionary comprises the pronunciation unit, the phonetic equivalent, and an association between the pronunciation unit and the phonetic equivalent, and wherein the phonetic equivalents dictionary is stored in the memory device.

19. The process of claim 16, said modifying comprising:

determining a data type of a search term of the at least one search term as a real number; and replacing the search term with a replacement number, wherein a digit sequence of the replacement number is identical to a digit sequence of the search term, and wherein a decimal point position of the replacement number is different from a decimal point position of the search term.

20. The process of claim 16, said modifying comprising:

determining a data type of a search term of said at least one search term as a special data; and replacing the search term with an interchangeable special data term, wherein a special data dictionary comprises the search term, the interchangeable special data term, and an association between the search term and the interchangeable special data term, and wherein the special data dictionary is stored in the memory device.

* * * * *